United States Patent [19]

Kaiser

[11] Patent Number: 4,889,642
[45] Date of Patent: Dec. 26, 1989

[54] METHOD AND FILTRATION APPARATUS FOR PURIFYING SOLVENTS

[75] Inventor: Klaus Kaiser, Neu-Bamberg, Fed. Rep. of Germany

[73] Assignee: Seitz Enzinger Noll Maschinenbau Aktiengesellschaft, Mannheim, Fed. Rep. of Germany

[21] Appl. No.: 228,953

[22] Filed: Aug. 4, 1988

[30] Foreign Application Priority Data

Aug. 4, 1987 [DE] Fed. Rep. of Germany ....... 3725761
Jul. 13, 1988 [DE] Fed. Rep. of Germany ....... 3823652

[51] Int. Cl.$^4$ ............................................. B01D 37/00
[52] U.S. Cl. ................................... 210/771; 210/186; 210/436; 210/167; 34/77; 34/78
[58] Field of Search ............... 210/771, 186, 436, 167; 34/76, 77, 78, 82

[56] References Cited

U.S. PATENT DOCUMENTS

| | | | |
|---|---|---|---|
| 2,367,487 | 1/1945 | Desetti et al. | 34/77 |
| 3,002,287 | 10/1961 | Smith | 34/77 |
| 3,087,254 | 4/1963 | Kobudera | 34/77 |
| 3,116,625 | 1/1964 | Stewart | 34/77 |
| 3,701,423 | 10/1972 | Lindstol | 210/798 |
| 3,712,088 | 1/1973 | Jaeger | 34/77 |
| 3,977,218 | 8/1976 | Zucchini | 210/167 |
| 4,086,705 | 5/1978 | Wehr | 34/77 |
| 4,217,700 | 8/1980 | Muller | 210/771 |
| 4,282,105 | 8/1981 | Crowe | 210/436 |
| 4,292,174 | 9/1981 | Smith et al. | 210/186 |
| 4,483,160 | 11/1984 | Jost | 34/77 |
| 4,494,317 | 1/1985 | Biagi et al. | 34/76 |
| 4,500,435 | 2/1985 | Müller | 210/798 |
| 4,520,577 | 6/1985 | Suissa | 34/76 |
| 4,592,847 | 6/1986 | Schumaker | 210/798 |
| 4,769,921 | 9/1988 | Kabakov et al. | 34/77 |

FOREIGN PATENT DOCUMENTS

3512361A1 8/1986 Fed. Rep. of Germany ...... 210/436

*Primary Examiner*—Richard V. Fisher
*Assistant Examiner*—Cynthia L. Nessler
*Attorney, Agent, or Firm*—Becker & Becker, Inc.

[57] ABSTRACT

A method and filtration apparatus for purifying solvents. Impurities present in the solvent are separated out in the filtration apparatus via filtration using at least one filter, through which the solvent flows and upon which the impurities settle as a filter cake. At least prior to the removal of the impurities that form the filter cake from the filtration apparatus, solvent residues present in the filter cake and possibly also in the filter are recovered by evaporation. The solvent residues in the filtration apparatus are vaporized by the action of a hot, gaseous medium that is conveyed first through the filter and only then through the filter cake, i.e. the impurities, in the direction opposite to the direction in which the solvent flowed through the filtration apparatus during the filtration process.

20 Claims, 3 Drawing Sheets

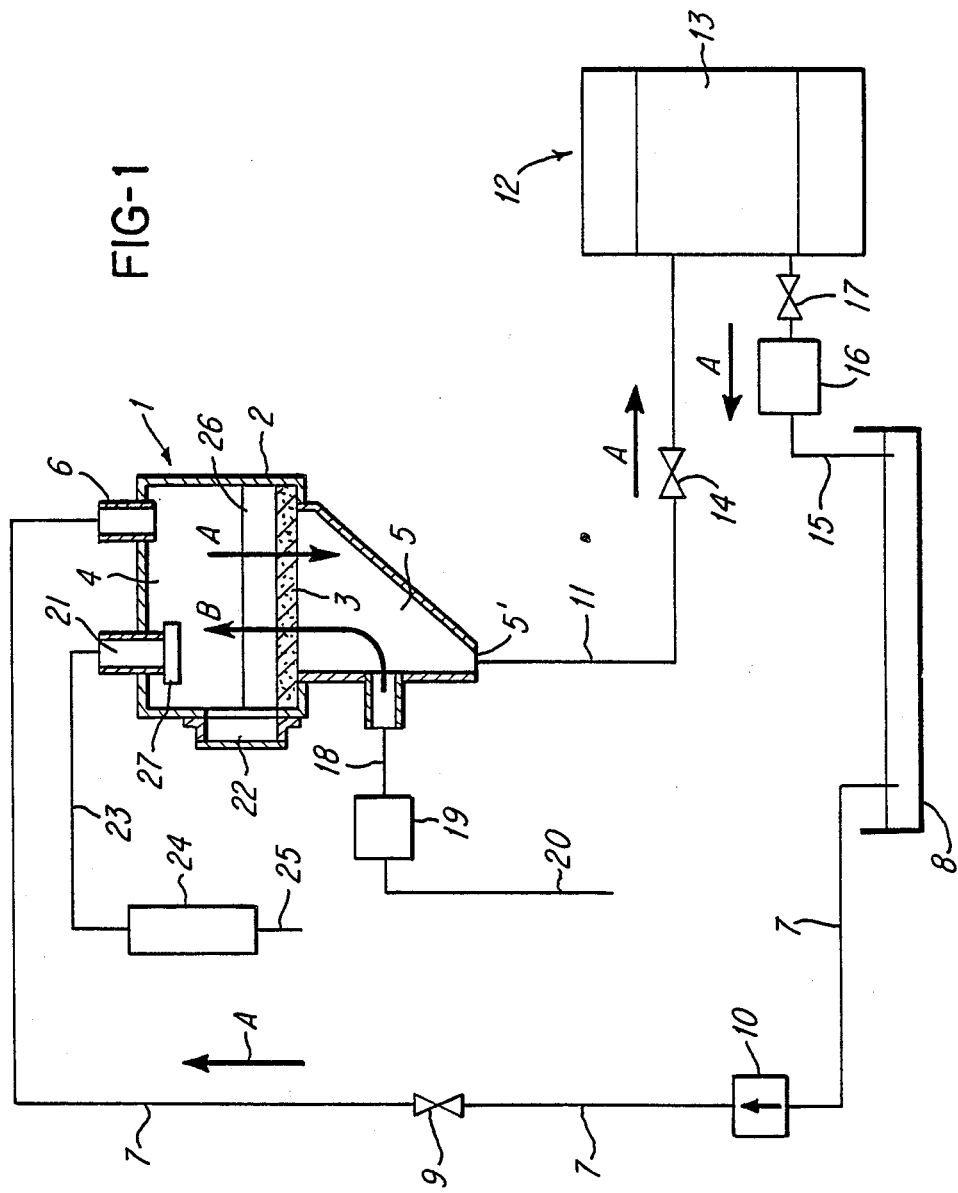

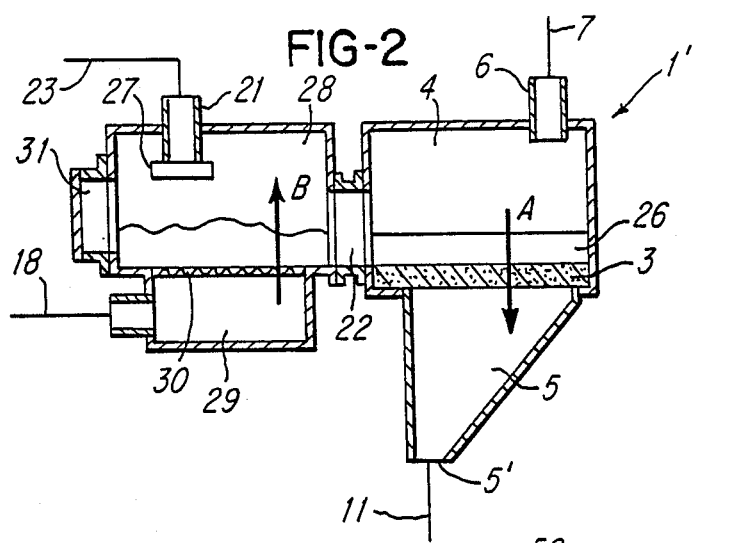
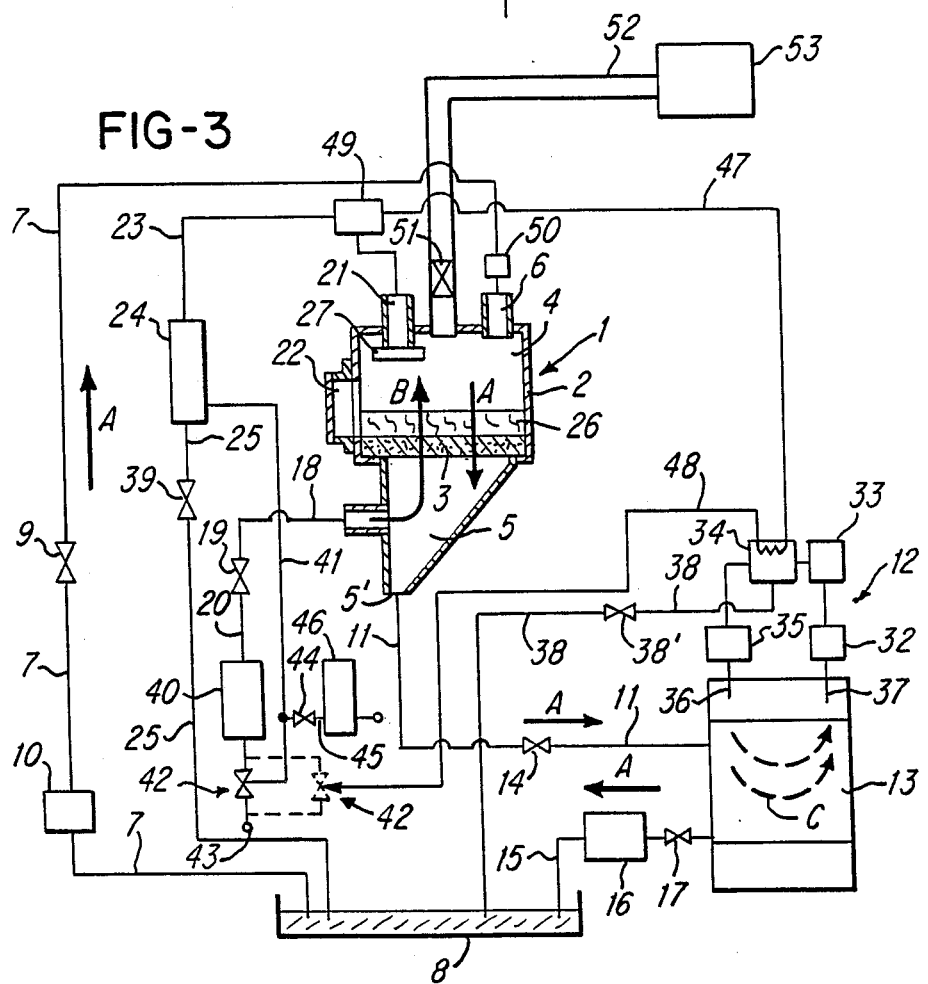

METHOD AND FILTRATION APPARATUS FOR PURIFYING SOLVENTS

BACKGROUND OF THE INVENTION

The present invention relates to a method of purifying solvents via filtration. The present invention also relates to a filtration apparatus for carrying out this method.

Liquid solvents are used in many industrial plants and systems for many different purposes. In this connection, the solvent used in the procedure generally becomes dirty or is contaminated with impurities. In order to purify the solvent, these impurities must then be filtered out in a filtration apparatus that uses at least one filter.

One example of the foregoing exists in purification units that are used for chemically cleaning various material or matter, such as for cleaning clothing or other textile materials. With these cleaning units, the solvent that is used as the cleaning agent to loosen the dirt must be filtered or purified in a filtration apparatus in order to prepare the solvent for a further cleaning process.

However, such filtration apparatus per se must be cleaned at least from time to time, in other words, the foreign substances or impurities that are separated off on the filter as a filter cake must be removed, which is often effected by replacement of the filter. However, since not only the filter cake deposited on the filter, but also the filter itself, contain a large amount of solvent residue, the disposal of the filter and the filter residue (impurities separated off as a filter cake) causes significant problems not only for health reasons but also for environmental protection reasons, and in particular not only with regard to the handling of these materials during cleaning of the filtration apparatus, but also with regard to the final storage or disposal of these materials.

With one known cleaning unit for chemically cleaning material, such as clothing or other textile material (German Pat. No. 31 50 015Jost dated July 14, 1983 and correspondingly U.S. Pat. No. 4,483,160—Jost dated Nov. 20, 1984) the cleaning unit includes a solvent circuit, which can be connected to a treatment chamber for the material and includes a filtration apparatus, as well as a warm air circuit that adjoins the treatment chamber, includes an air-conveying mechanism, an air heater, as well as an air cooler, and that serves for removing solvent residue from the material after it has been treated, i.e. cleaned. With this known unit, during the treatment of the material in the warm air circuit, a portion of the air of this warm air circuit is also conveyed through the filtration apparatus in order therein to vaporize solvent residues present in the filter or in the filter cake; these vaporized residues are then condensed at the air cooler of this warm air circuit and are separated out. One of several drawbacks of this heretofore known cleaning unit is that the vaporized solvent residues, which are carried along by the air out of the filtration apparatus, pass into the treatment chamber where the material that is present, for example clothing or other textile materials, then receive more vaporized solvent. However, the chief drawback of this heretofore known cleaning unit is that the warm air that is branched off from the warm air circuit flows through the filter in the filtration apparatus in the same direction in which the solvent also flows through this filter. As a result, the filter cake deposited on the filter is compacted or compressed by the warm air, thereby closing off the passages in the filter cake and in the filter, so that it is impossible to have a uniform flow-through of the filter cake and filter, and it is also impossible to have a rapid and especially complete removal of the solvent residues in the filter and in the filter cake. Another drawback is that for the recovery of the solvent residues in the filter and in the filter cake, operating stages of the cleaning unit are used that are actually provided for a different purpose, namely for removing solvent residues from the material that is to be treated or cleaned, so that these operating stages are not optimally adapted to the conditions necessary for the recovery of solvent residues from the filter and filter cake. This applies, among other things, to the temperature of the warm air stream, which temperature, already for reasons of a careful and protective treatment of materials, for example of delicate textiles, cannot be as high as desired, i.e. cannot be selected in such a way that this temperature suffices for an optimum and complete recovery of the solvent residues in the filter and in the filter cake, especially not in a short period of time.

It is furthermore known (German Offenlegungsschrift 35 12 361Jost dated Aug. 14, 1986), in the filtration apparatus of a cleaning unit for cleaning clothing or other textile material, to provide a heating mechanism for heating the filter as well as the filter cake deposited on this filter. With this heating device, solvent residues in the filter and in the filter cake are vaporized and can be drawn off in this vaporized form. This known arrangement also has the drawback that the filter cake deposited on the filter is compressed and passages in this filter cake and in the filter are closed, since the withdrawal of the vaporized solvent residues is effected in the same direction in which the solvent of the solvent circuit previously flowed through the filter. Furthermore, with this heretofore known arrangement considerable temperature differences in the filter cake cannot be avoided. On the one hand, these temperature differences can, in the hotter regions of the filter cake, cause the impurities that form the filter cake to bake together or to form a connection with the filter that is very difficult to loosen. On the other hand, especially when the impurities that form the filter cake contain fusion-sticky constituents, regions with closed passages in the filter cake and in the filter are formed where low temperatures exist, i.e. where during withdrawal of the vaporized solvent residues cooler air flows through; these regions with closed passages then also make it impossible for the air that flows through during the withdrawal of the vaporized solvent residues to flow uniformly through the filter cake and the filter, thus also making it impossible to completely remove the solvent residues. In addition, if the solvent is a readily inflammable substance, the heating device provided in the filtration apparatus also causes great problems for safety reasons.

It is therefore an object of the present invention to provide a method and apparatus that avoid the aforementioned drawbacks and make it possible to safely and reliably remove solvent residues from the impurities, within the pertaining unit, prior to removal of these impurities from the filtration apparatus and prior to storage and disposal thereof.

BRIEF DESCRIPTION OF THE DRAWINGS

This object, and other objects and advantages of the present invention, will appear more clearly from the following specification in conjunction with the accompanying schematic drawings, in which:

FIG. 1 is a view that illustrates the solvent circuit of a cleaning unit for chemically cleaning material, and also illustrates one exemplary embodiment of the inventive filtration apparatus for separating out impurities from the solvent;

FIG. 2 is a view that illustrates a further exemplary embodiment of the inventive filtration apparatus; and FIG. 3 is an expanded view, similar to FIG. 1, of further exemplary embodiments of the present invention.

SUMMARY OF THE INVENTION

The method of the present invention for purifying solvents via filtration includes the steps of: providing a filtration apparatus having at least one filter; passing the solvent through the filter means in the filtration apparatus in a first direction of flow to filter out foreign substances or impurities from the solvent, whereby the impurities settle on an upstream side of the filter means, as viewed in the first direction of flow, where they form a filter cake; and at least prior to a removal of filtered-out impurities from the filtration apparatus, passing hot, gaseous medium, preferably hot or warm air, in a second direction of flow that is opposite to the first direction of flow, to vaporize any solvent residues in the impurities and in the filter means.

The inventive filtration apparatus for purifying solvents in conformity with the aforementioned method comprises: a housing; at least one filter disposed in the housing and dividing the same into first chamber means and second chamber means, with the first chamber means serving to receive solvent containing impurities, and with the second chamber means serving for the withdrawal of purified solvent, whereby solvent flows through the filter means and the impurities in the solvent are filtered out as a filter cake on a side of the filter means that faces the first chamber means; a source of hot, gaseous medium, preferably warm or hot air, for vaporizing solvent residue in the impurities and the filter means in the housing; inlet means provided on the second chamber means for receiving hot, gaseous medium from the source thereof; and outlet means provided on the first chamber means for the withdrawal of hot, gaseous medium and vaporized solvent residue.

Pursuant to one embodiment of the present invention, within that portion of the filtration apparatus that also serves for filtering the solvent, hot, gaseous medium, preferably warm or hot air, is supplied to the solvent-residue-containing impurities or the filter cake formed of these impurities. With this embodiment, the hot, gaseous medium flows through the filter and hence also through the filter cake deposited on this filter in a direction of flow that is opposite to the direction of flow in which the solvent that is to be cleaned flows through the filter. In other words, the hot, gaseous medium is guided in such a way that it enters the filter on that side thereof that is remote from the filter cake. As a result, above all a loosening of the filter cake is achieved, so that in the filter cake, over the entire surface of the filter, finely dispersed passages for the through-flow of the hot, gaseous medium can be formed, and hence the gaseous medium can flow uniformly through all regions of the filter and the filter cake. Thus, nearly all of the solvent residues in the entire filter and filter cake are vaporized and removed. Passing hot, gaseous medium through in this fashion also prevents the passages in the filter from becoming clogged, and the filter cake from compacting or the impurities from being pressed against the filter. In contrast, the passages that are required in the filter cake and in the filter for the vaporization are opened by the gaseous medium This is particularly of great advantage if the impurities deposited on the filter are at least partially viscous or sticky.

Pursuant to a specific embodiment of the present invention, in addition to that portion that forms the actual filtration apparatus, a vaporizer mechanism is also provided into which are introduced the impurities (possibly together with the filter) that are loaded with the solvent residues, and in which then the hot, gaseous medium is supplied to these impurities to vaporize the solvent residues.

If the filtration apparatus is part of a cleaning unit for chemically cleaning material, such as clothing or other textile material, with the cleaning unit including a treatment chamber for the material, a solvent circuit that can be connected to this treatment chamber and includes the filtration apparatus, as well as a warm air circuit that can be connected to the treatment chamber for removing solvent residues from the material after the latter has been treated, and with this warm air circuit including an airconveying mechanism, an air cooler, and air heater, the source for the hot, gaseous medium (for vaporizing solvent residues in the filter and in the filter cake) is formed by a hot air blower, which is provided in addition to the air heater of the warm air circuit. In this way, it is possible to optimally adapt the quantity and temperature of the hot air that serves for vaporizing the solvent residues in the filter and in the filter cake to this particular application, since the means that serve for generating the hot air stream are not dependent upon operating stages required for cleaning the material. Furthermore, with this embodiment it is also possible, for a large cleaning unit having several treatment chambers, to provide a filtration apparatus that is common to at least several of the treatment chambers.

Further specific features of the present invention will be described in detail subsequently.

DESCRIPTION OF PREFERRED EMBODIMENTS

Referring now to the drawings in detail, FIG. 1 shows a filtration apparatus 1 with a closed housing 2, the interior of which is divided by a filter 3 into two chambers, namely the upper chamber 4 and the lower chamber 5. In conformity, for example, to the respective application, the structural configuration of the filtration apparatus 1, as well as the overall unit etc., the filter 3 can have any desired shape, and can be made of different materials or material combinations, for example filter paper, filter mesh, filter fabric, etc. In other words, any material or material combination is basically suitable for the filter 3 if it or they, due to their porosity, permit the solvent to pass through the filter 3 while at the same time assuring an adequate separate of foreign substances or impurities from the solvent. In this sense, among others, granular materials are suitable to form the filter 3 in the form of a cover or protective layer on a base through which the solvent flows. In addition, it is not absolutely necessary that the filter 3 be planar; instead, other shapes or configurations of the filter 3 could also be expedient.

Provided on the chamber 4 of the filtration apparatus 1 is a solvent inlet 6 that is connected via a line 7 with a storage tank 8 for the solvent. Disposed in the line 7 are a valve 9 and a feed pump 10.

The chamber 5 is disposed below the chamber 4, and narrows or tapers in a funnel-like manner in the direction of its lower end. This lower end, and in particular the outlet 5', is connected via a line 11 to the solvent inlet of the treatment chamber 13, which is disposed in the part 12 of the unit. The treatment of the material or other matter with the solvent is effected in this chamber, which in a purification unit for chemically cleaning material is provided with the treatment or cleaning drum that is conventional with such units.

In the illustrated embodiment, a further valve 14 is provided in the line 11. A lower outlet of the treatment chamber 13 is connected via a return line 15 to the storage tank 8, whereby in this embodiment a filtration unit 16, as well as a valve 17, are provided in the return line 15.

Opening out into the chamber 5 is a line 18 that is connected via a valve 19 and a line 20, which is connected to the inlet of this valve, to a non-illustrated source of warm air.

The chamber 4 of the filtration apparatus 1 has two outlet 21 and 22. The outlet 21, which in FIG. 1 is provided on the upper side of the housing 2 remote from the filter 3, is connected via a channel or line 23 to the inlet of a cooling unit 24, the outlet of which is connected to a channel or line 25. The outlet 22, which in FIG. 1 is provided on the vertical peripheral wall of the housing 2 in the vicinity of the filter 3, is in the simplest case an opening that is provided for cleaning the filtration apparatus 1, and that can be closed off by a flat, lid, cover, etc.

To treat the material that is in the treatment chamber 13 with the solvent, the feed pump 10 is turned on, the valves 9 and 14 are opened, and the solvent is supplied to the treatment chamber 13 via the lines 7 and 11, with the solvent flowing through the lines 7 and 11, as well as through the filter 3, in the direction indicated by the arrow A. During this treatment phase (for example during the cleaning of material), the solvent can, of course, also be conveyed in a closed cycle. In other words, in this case the valve 17 is also opened, so that solvent can then constantly also flow out of the treatment chamber 13 back to the storage tank 8.

The impurities that are present in the solvent, and that mainly originate from the treatment of the material with this solvent, are separated off, for example, as a filtered cake 26 in the filtration apparatus 1 on that side of the filter 3 that faces the chamber 4. After the conclusion of the treatment phase, not only the filter 3, but also the filter cake 26 is saturated with the solvent; in other words, solvent residue is present. Already for environmental protection reasons, it is necessary to remove the solvent residue present in the filter cake 26 or in the filter 3, especially when the filtration apparatus 1 has to be cleaned, in other words, it is necessary to remove the impurities that form the filter cake 26, or it is necessary to replace the filter 3. For this purpose, with the feed pump 10 turned off and the valves 9 and 14 closed, warm or hot air is supplied to the chamber 5 via the opened valve 19 and the line 18. This warm or hot air flows upwardly through the filter 3 and the filter cake 26 from below in the direction of the arrow B, i.e. in a direction of flow that is opposite to the direction of flow A of the solvent. The warm or hot air then vaporizes the solvent residues in the filter 3 and in the filter cake 26, and in this vaporous phase conveys the residues through the outlet 21 and to the cooling unit 24. The solvent residues are again condensed in the cooling unit 24, so that these residues can then, as condensate or in liquid form, be returned either directly to the storage tank 8 or via the treatment chamber 13 to the storage tank 8. Due to the fact that the warm air flows through the filter 3 and the filter cake 26 in the direction that is opposite to the direction of flow of the solvent, the filter cake 26 is loosened and pores or passages of the filter 3 that have possibly become clogged or covered by impurities are opened, thus assuring a very intensive flow through the filter 3, and especially through the filter cake 26, so that all solvent residues present in the filter 3 and in the filter cake 26 are vaporized. After the removal of the solvent residues, the warm air stream can also be used to remove the impurities that form the filter cake 26, or at least the warm air stream can help to accomplish this.

In order to prevent the warm air stream that leaves the chamber 4 at the outlet 21 from carrying along foreign substances or impurities, it can be expedient to provide a coarse filter or screen 27 at this outlet.

It is furthermore also possible to embody the filtration unit 16 in the same manner as the filtration apparatus 1, in which case the chamber 4 with the solvent inlet 6 is connected to the treatment chamber 13, and the chamber 5 with the outlet 5' is connected to the return line 15.

In a modification of the illustrated embodiment, the hot, gaseous medium can also be supplied to the chamber 5 via the outlet 5'. In principle, it is furthermore also possible, for the withdrawal of the hot, gaseous medium, to use the solvent inlet 6 instead of the outlet 21, with the solvent inlet 6 then being connectable via a control valve mechanism either to the line 7 or to the line 23.

FIG. 2 shows a further exemplary embodiment of the inventive filtration apparatus. This filtration apparatus 1' has a total of four chambers, namely the two chambers 4 and 5 that are separated from one another by the filter 3 and are provided with the respective solvent inlet 6 and the outlet 5' in conformity with the filtration apparatus 1, as well as two further chambers 28 and 29 that are disposed one above the other as well as to the side of the chambers 4 and 5, and that are separated from one another by a grate or screenlike element 30. The upper chamber 28 is connected to the closable outlet 22 of the chamber 4. In addition, the upper chamber 28 is provided with the upper outlet 21, while the channel or line 18 opens into the lower chamber 29.

With this embodiment, where again the solvent inlet 6 is connected to the line 7 and the outlet 5' is connected to the line 11, the removal of the solvent residues from the impurities filtered out of the solvent, i.e. from the filter cake 26, is effected by introducing these impurities in the moist state, i.e. in that state where they are saturated with the solvent residues, after opening the outlet 22, onto the screen or grate-like element 30 that is disposed in the chamber 28; in particular, for example, this introduction of the impurities into the chamber 28 can be effected with the aid of a non-illustrated discharge or withdrawal mechanism, such as a pusher, extractor, etc., or in some other suitable manner. To vaporize the solvent residues, the outlet 22 is closed, and hot, gaseous medium, such as warm air, is supplied to the lower chamber 29 via the line 18. This hot, gaseous medium flows upwardly from below in the direction of the arrow B through the element 30 as well as through the filtered-out impurities that are disposed on the element 30. In this way, as described above, the solvent residues are vaporized and are carried along in vaporous form to the cooling unit 24. The chambers 28 and 29 thus form a vaporizer mechanism that is provided in addition to the actual filtration apparatus, with this embodiment having the particular advantage that the recovery of the solvent residues can be effected during the normal operation of the unit. Furthermore, this embodiment, where the impurities filtered out of the solvent could also be accumulated over a greater period of time, of course also has the advantage that during cleaning of the filtration apparatus, i.e. during removal of the impurities which have been freed of the solvent residues, through the closable outlet 31 of the chamber 28, it is necessary to handle only materials that practically no longer have any solvent residues. Since with the embodiment of FIG. 2 the hot, gaseous medium flows upwardly through the element 30 from below, i.e. enters the element on that side remote from the impurities, here also there is again achieved a loosening of the impurities on the element 30 and a thorough, uniform flow-through of all of the impurities, and in particular in the same manner as described above for the embodiment of FIG. 1 in connection with the filter cake 26.

The filtration apparatus 1' can furthermore also be embodied in such a way that the introduction of the impurities that form the filter cake 26 from the chamber 4 into the chamber 28 is effected by transferring the filter 3, together with the filter cake 26, into the vaporizer mechanism formed by the chambers 28 and 29. In this case, the filter 3 that is provided with the filter cake 26 then assumes the function of the element 30. i.e. the element 30 is dispensed with and at the same time that the filter 3 is removed from the actual filtration apparatus formed by the chambers 4 and 5, a new, fresh filter is inserted in the filtration apparatus, i.e. between the chambers 4 and 5 thereof. Especially when the filter 3 is intended to be reused, it is also possible to provide an appropriate transport mechanism on which at least two filters 3 are provided that are then respectively movable out of the region of the chambers 4 and 5 into the region of the chambers 28 and 29, as well as out of the region of the chambers 28 and 29 back into the region of the chambers 4 and 5.

In principle, it is furthermore also possible to embody and operate the vaporizer mechanism for vaporizing the solvent residues in a manner other than that described.

For example, with the embodiment of FIG. 2 it can be expedient, during the loosening of the impurities during the removal process, to supply the gaseous medium via the line 23 and to withdraw gaseous medium that contains solvent via the line 18. In this case, the grate or screen-like element 30 replaces the means 27.

Pursuant to a further embodiment of the present invention, with the embodiment of FIG. 2 it is expedient, prior to the removal process, to dry the filter cake for a short time on that side facing the filter 3 so that the filter cake can be loosened from the filter 3 without difficulty in the case where the filter cake is sticky in the wet or moist state. For this surface drying, the chambers 4 and 5 should have the configuration illustrated in FIG. 1, so that for the drying procedure the hot, gaseous medium can be supplied from below, and can then be withdrawn from above after it has passed through the cake.

FIG. 3 again shows the elements that were described in conjunction with FIG. 1, and in particular shows in a somewhat more detailed fashion essentially two possible embodiments for the flow path of the hot, gaseous medium for recovering the solvent residues from the filter 3, as well as the elements that are necessary for conveying the recovered solvent to the storage tank 8.

In FIG. 3, first of all there are provided in the portion 12 of the cleaning unit, above the treatment chamber 13, a slub filter 32, an air-conveying mechanism 33 that is formed, for example, from a blower or a fan, an air cooler 34, and an air heater 35. These elements form a warm air circuit that follows the treatment chamber 13 and that with all chemical cleaning elements or machines is customary and serves, after the treatment or cleaning of the material accommodated in the treatment chamber 13 or in a drum therein, as well as after centrifuging of this material or matter, for the vaporizing and thereby removal from the material, via the warm air of the circuit, of solvent residue that is still present. For this purpose, heated air is supplied to the treatment chamber 13 from the air heater 35 via a war air inlet 36 of the warm air circuit. The warm air then flows through the treatment chamber 13, as indicated by the arrows C, and again leaves the treatment chamber 13 at a warm air outlet 37 of the warm air circuit. From the warm air outlet 37, the warm air, which has received vaporized solvent, then passes via the slub filter 32 and the air-conveying mechanism 33 connected to the latter, which mechanism 33 effects the circulation of the air in the warm air circuit, to the air cooler 34. The vaporized solvent carried along by the warm air is condensed in the air cooler 34, and the condensed solvent is conveyed to the storage tank 8 via a line 38 that is preferably provided with a valve 38', which would then be opened. Air that is for the most part purged of solvent is then available at the outlet of the air cooler 34 and is supplied to the air heater 35 that follows the air cooler: via this air heater 35, the air can again flow to the treatment chamber 13.

Completely independent of this warm air circuit, which is necessary for cleaning the material or matter in the cleaning machine, are the features that will be described subsequently, and that are used, after termination of each cleaning process or after several terminated cleaning processes, to recover solvent residues from the filter 3 and from the filter cake 26.

With an embodiment such as that illustrated in FIG. 3, a hot air or vaporization circuit is provided for the recovery of the solvent residues in the filter 3 and in the filter cake 26. In addition to the lines 18, 20, 23, and 25 already described in conjunction with the embodiment of FIG. 1, and in addition to the valve 19 between the lines 18 and 20 as well as in addition to the cooling unit 24 between the lines 23 and 25, this hot air or vaporization circuit is also provided with the following elements:

A valve 39 in the line 25 that leads to the storage tank 8; a hot air blower 40, the output side of which is connected to the line 20; and a line 41 for air, with one end of this line being connected to the cooling unit 24, and with the other end of this line being connected to one inlet side of a three-way valve 42. The other inlet side 43 of this three-way valve 42 leads to the atmosphere, and the outlet side of this three-way valve 42 is connected to the inlet side of the hot air blower 40.

To remove solvent residues from the filter 3 and from the filter cake 26, the filtration apparatus 1 is separated from the solvent circuit by closing the valves 9 and 14, and the input side of the hot air blower 40 is connected to the line 41 by opening the valves 19 and 39, as well as by appropriate adjustment of the three-way valve 42. After the hot air blower 40 has been turned on, the hot air passes into the chamber 5 and from there, in the direction of the arrow B, flows through the filter 3 and the filter cake 26. The vaporized solvent residues that are carried along by the hot air are then condensed in the cooling unit 24 and can flow back into the storage tank 8 via the line 25. The air passes over the line 41 and the three-way valve 42 to the inlet side of the hot air blower 40, and from there, after again being heated up, can be conveyed back to the chamber 5. At the end of this treatment, during which the hot air stream is circulated for a predetermined period of time in the hot air circuit in the manner described, the filter 3 as well as the filter cake 26 are expediently additionally supplied with heated fresh air. For this purpose, the three-way valve 42 is actuated in such a way that that inlet side thereof that is connected to the line 41 is closed, and the inlet side 43 that leads to the atmosphere is opened. Furthermore, a valve 44 in a line 45 that branches off from the line 41 is opened; this line 45 leads to an adsorber 46 that has an outlet to the atmosphere. The hot air blower 40 then draws in ambient air via the inlet side 43, with this air, as hot air, then flowing through the filter 3 and the filter cake 26 in the direction of the arrow B, with this air furthermore being relieved for the most part of the vaporized solvent residues in the cooling unit 24, and then being discharged into the atmosphere via the adsorber 46, with the latter retaining still present, vaporized solvent residues and other material that are not to be conveyed into the atmosphere.

As an alternative or in addition to the described vaporization or hot air circuit, a hot air circuit having the following elements can be provided:

A line 47, one end of which is connected to the outlet 21 and the other end of which is connected to the air cooler 34 of the warm air circuit; as well as a line 48, one end of which is connected to an outlet of the air cooler 34, and the other of which is connected to the one input side of the three-way valve 42, which inlet side is connected to the line 41 as previously described.

For this second embodiment of the hot air circuit of FIG. 3, the three-way valve 42 is indicated with dashed lines. The manner of operation of this second, possible embodiment of the hot air circuit is in principle the same as the previously described manner of operation of the first embodiment, merely with the difference that the air cooler 34, instead of the cooling unit 24, serves to separate off the vaporized solvent residues carried along by the hot air with these solvent residues then being conveyed via the line 38 to the storage tank 8. Also with this second embodiment a post treatment with ambient or fresh air is possible, whereby in this case the inlet side 43 of the three-way valve 42 is again opened to the atmosphere, and the line 48 communicates with an adsorber that corresponds to the adsorber 46 and leads to the atmosphere. The lines 23, 25, 41 and the cooling unit 24, as well as the adsorber 46 connected to this cooling unit, are not needed with this second embodiment of the hot air circuit.

In principle, however, it is also possible to provide both of the described hot air circuits at the same time, whereby at the outlet 21 a three-way valve or a similar valve arrangement 49 is then expediently provided with which this outlet 21 can be selectively connected to the line 23 or to the line 47.

Since the hot air flows through the filter 3 and the filter cake 26 in the direction of the arrow B, during the vaporization of the solvent residues in the previously described manner by the hot air there is simultaneously also achieved a loosening of the filtered cake 26. In any case, the hot air stream is prevented from compacting the filter cake 26 or clogging the filter 3 in such a way that it is no longer possible for the hot air to adequately and uniformly flow through the filter 3 and the filter cake 26. This is especially of significance if the filter cake 26 also includes sticky and mud-like constituents. The fact that the hot air flows through the filter 3 and the filter cake 26 in the direction of the arrow B counter to the direction of flow A of the liquid circuit also has the advantage that the air stream generated by the blower 40 can at the same time serve to carry out from the chamber 4 the foreign material or impurities that form the filter cake 26. With this possible embodiment in addition to the valve arrangement 49, or some other appropriate valve, at the outlet 21, a valve mechanism 50 is also provided at the solvent inlet 6. In addition, a channel 52 is provided that can be closed off via a closure mechanism 51. One end of the channel 52 opens into the upper chamber 4, and the other end of the channel 52 is connected to a collection element 53, such as a filter bag. In the simplest case, the closure mechanism 51 is formed by a lid or a damper that is normally closed and that is opened only for the removal of the impurities that form the respective filter cake 26. When the closure element 51 is opened and the valve mechanisms 49 and 50 are closed, an air stream that is drawn in by the hot air blower 40 via the opened inlet 43 can then loosen the impurities that form the filter cake from the filter 3 and convey them through the channel 52 into the collection element 53. For this purpose, the hot air blower 40 is preferably embodied in such a way that when blowing out the impurities that form the filter cake 26, the heating device of this hot air blower 40 is turned off, and the hot air blower preferably has a greater air-conveying capacity. In principle, it is also possible for the collection element 53 to be part of a suction mechanism, the action of which is then supplemented by the hot air blower 40, which operates in the previously described manner. To facilitate entry of the dry impurities, which form the filter cake 26 and have been loosened from the filter 3, into the channel 52, it is expedient to embody that wall of the housing 2 opposite the filter 3, starting from the opening of the channel 52, in a funnel-like manner.

The present invention is, of course, in no way restricted to the specific disclosure of the specification and drawings, but also encompasses any modifications within the scope of the appended claims.

What I claim is:

1. In a method of purifying organic solvents via filtration, the improvement in combination therewith comprising the steps of:

providing a filtration apparatus having filter means;

passing said organic solvent through said filter means in a first direction of flow to filter out impurities from said organic solvent, whereby said impurities settle on an upstream side of said filter means, as viewed in said first direction of flow, where the impurities are delivered from said organic solvent to form a filter cake;

passing hot, gaseous medium through any organic solvent residues in said filter means as well as at least said filtered-out impurities, in a second direction of flow that is opposite to said first direction of flow of said organic solvent, for the purpose of vaporizing any organic solvent residues in at least said filtered-out impurities so that organic solvent residues are reclaimed therefrom;

transferring said filter cake to a vaporizer mechanism having a separate chamber means fluidly communicating with said filtration apparatus; and passing said hot, gaseous medium through said impurities of said transferred filter cake.

2. A method of purifying solvents via filtration, including the steps of:

providing a filtration apparatus having filter means;

passing said solvent through said filter means in a first direction of flow to filter out impurities from said solvent, whereby said impurities settle on an upstream side of said filter means, as viewed in said first direction of flow, where they form a filter cake;

removing said filtered-out impurities from said filtration apparatus;

at least prior to the removal of filtered-out impurities from said filtration apparatus, passing hot, gaseous medium through at least said filtered-out impurities that are to be removed, in a second direction of flow that is opposite to said first direction of flow of said solvent, for the purpose of vaporizing any solvent residues in at least said filtered-out impurities that are to be removed; and providing said filtration apparatus with a vaporizer mechanism disposed in a separated chamber means communicating with the filtration apparatus, transferring said filter cake to said vaporizer mechanism, and then in said vaporizer mechanism passing said hot, gaseous medium through said impurities of said transferred filter cake.

3. A method according to claim 2, in which said hot, gaseous medium is hot air.

4. A method according to claim 2, which includes a further step, after said passing of said solvent through said filter means, and prior to said passing said hot, gaseous medium through at least said impurities, of passing said hot, gaseous medium through said filter means to also vaporize any solvent residues therein.

5. A method according to claim 2, in which said gaseous medium is passed upwardly through at least said filtered-out impurities from below.

6. A method according to claim 2, said method including further steps comprising:

dividing a housing with said filter means disposed therewith to separate into first chamber means and second chamber means, with said first chamber means serving to receive solvent that contains impurities, and with said second chamber means serving for the withdrawal of purified solvent, said solvent flowing through said filter means and filtering out said impurities in said solvent as a filter cake on a side of said filter means that faces said first chamber means;

passing a source of the hot, gaseous medium for vaporizing solvent residue in at least some of said filtered-out impurities in said housing;

arranging inlet means associated with said housing for receiving the hot, gaseous medium from said source thereof; and withdrawing from outlet means associated with said housing to remove said gaseous medium and reclaiming the vaporized organic solvent residue therefrom.

7. A filtration apparatus for purifying solvents via filtration, including an arrangement having filter means; said filter means having said solvent pass therethrough in a first direction of flow to filter out impurities from said solvent, whereby said impurities settle on an upstream side of said filter means, as viewed in said first direction of flow, where they form a filter cake;

means for passing hot, gaseous medium through at least said filtered-out impurities prior to their removal from said filtration apparatus, in a second direction of flow that is opposite to said first direction of flow of said solvent, for the purpose of vaporizing any solvent residues in at least said filtered-out impurities that are to be removed; said apparatus further comprising:

a housing;

inlet means connected to said housing for receiving the gaseous medium;

outlet means connected to said housing for withdrawing the gaseous medium;

filter means disposed in said housing and dividing same into first chamber means and second chamber means, with said first chamber means serving to receive solvent that contains impurities, and with said second chamber means serving for the withdrawal of purified solvent, whereby said solvent flows through said filter means and said impurities in said solvent as a filter cake on a side of said filter means that faces said first chamber means; and a further chamber means, in the form of a vaporizer mechanism, that is provided with both a further chamber inlet means and a further chamber outlet means for said gaseous medium, with said further chamber means communicating with said first chamber means for receiving filtered-out impurities therefrom.

8. A filtration apparatus according to claim 7, in which said housing inlet means for said gaseous medium is formed by a connection that is provided on said second chamber means for the withdrawal of purified solvent.

9. A filtration apparatus according to claim 7, in which said second chamber means includes both a second chamber outlet for purified solvent, and said housing inlet means for said gaseous medium.

10. A filtration apparatus according to claim 7, in which said housing outlet means is formed by a connection that is provided on said first chamber means for receiving said solvent that is to be purified.

11. A filtration apparatus according to claim 7, in which said first chamber means includes both an inlet for solvent that is to be purified, and said housing outlet means for said gaseous medium and vaporized solvent residue.

12. A filtration apparatus according to claim 7, in which said further chamber means of said vaporizer mechanism is formed by a third chamber means and a fourth chamber means that are separated from one another by an element that serves as a support surface for filtered-out impurities, and that is provided with passage means for gaseous medium, with said third chamber means being provided with said further chamber outlet means for said gaseous medium, and with said fourth chamber means being provided with said further chamber inlet means for said gaseous medium.

13. A filtration apparatus according to claim 12, in which a side of said element facing said third chamber means serves as said support surface; in which a closable channel provides said communication between said first chamber means and said third chamber means; and in which a filter or screen is provided at said further chamber outlet means for said gaseous medium.

14. A filtration apparatus according to claim 7, for a cleaning unit for chemically cleaning material, with said cleaning unit having means forming a treatment chamber for said material, a solvent circuit that can be connected to said treatment chamber and that includes said filtration apparatus, and a warm air circuit that can be connected to said treatment chamber for removing solvent residue from said material after the latter has been treated with said solvent, with said warm air circuit including an air-conveying mechanism, an air cooler, and an air heater, with said source of hot, gaseous medium being formed by a hot air blower that is independent of said air heater of said warm air circuit.

15. A filtration apparatus according to claim 14, in which said hot air blower is disposed in a separate hot air or vaporizer circuit that includes cooling means.

16. A filtration apparatus according to claim 15, in which said cooling means is said air cooler of said warm air circuit, with said air cooler having an inlet and outlet that are connected directly to said vaporizer circuit.

17. A filtration apparatus according to claim 15, in which said cooling means is a cooling unit that is provided in addition to said air cooler of said warm air circuit.

18. A filtration apparatus according to claim 7, in which said housing is provided with discharge means for the removal of at least some of said filtered-out impurities.

19. A filtration apparatus according to claim 18, in which said discharge means is provided on said first chamber means near said filter means.

20. A filtration apparatus according to claim 18, in which said discharge means is in the form of a closable channel having two ends, one of which is connected to said housing, the other of which is connected to a collection element for said impurities.

* * * * *